Oct. 27, 1953  F. F. BRYAN  2,656,837
DEVICE FOR FACILITATING THE SWALLOWING OF
PILLS, TABLETS, CAPSULES, AND THE LIKE
Filed July 6, 1951  2 Sheets-Sheet 1
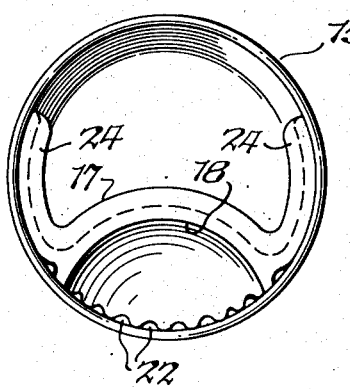
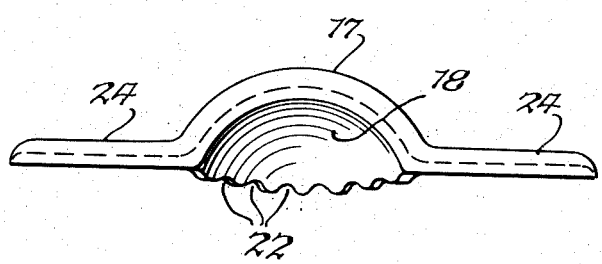
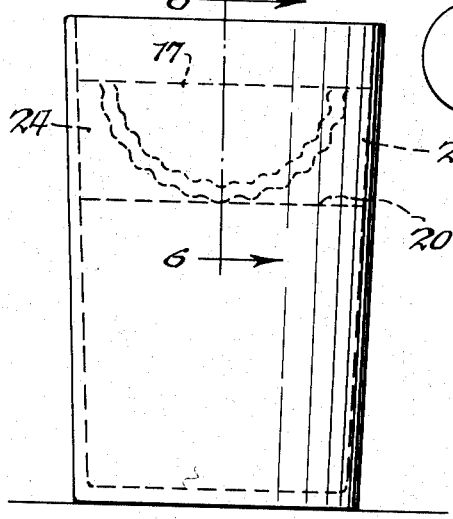
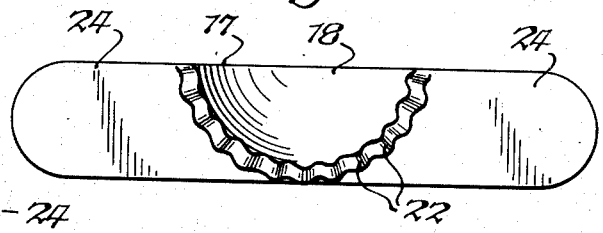
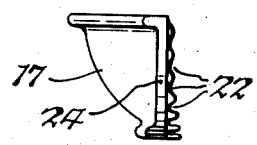
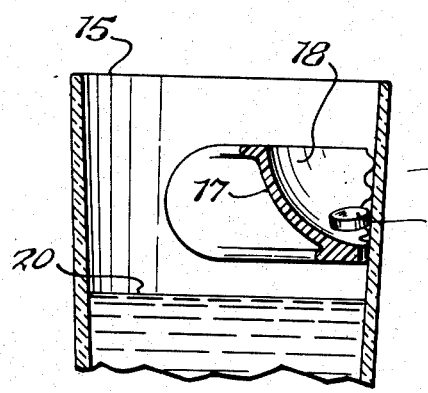
INVENTOR.
Fred F. Bryan,
BY Parker, Rochmor Farmer,
Attorneys.

Oct. 27, 1953     F. F. BRYAN     2,656,837
DEVICE FOR FACILITATING THE SWALLOWING OF
PILLS, TABLETS, CAPSULES, AND THE LIKE
Filed July 6, 1951     2 Sheets-Sheet 2
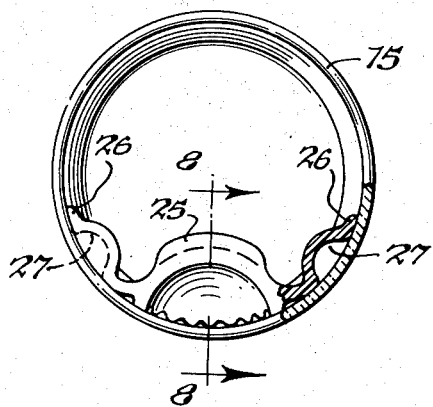
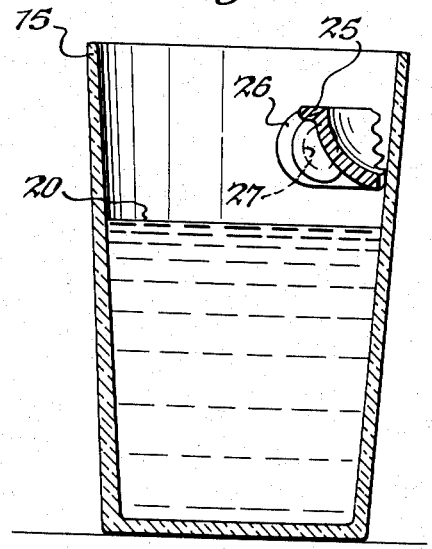
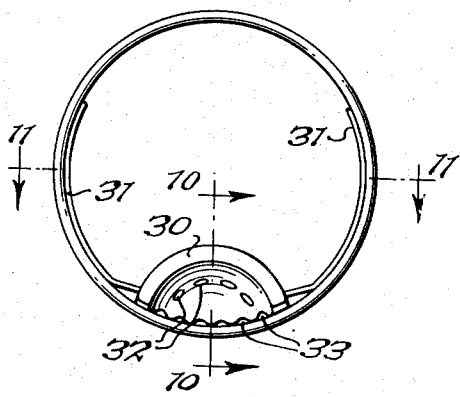
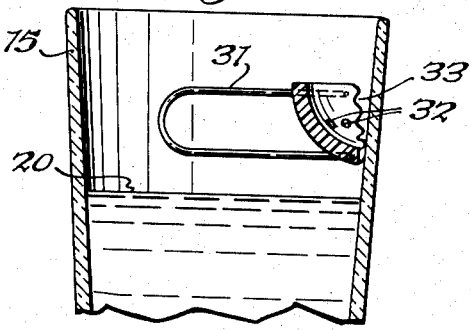
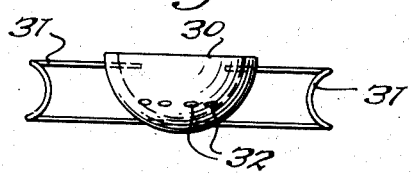

Patented Oct. 27, 1953

2,656,837

UNITED STATES PATENT OFFICE 2,656,837

DEVICE FOR FACILITATING THE SWALLOWING OF PILLS, TABLETS, CAPSULES, AND THE LIKE

Freel F. Bryan, Buffalo, N. Y.

Application July 6, 1951, Serial No. 235,530

6 Claims. (Cl. 128—222)

This invention relates to devices for use in facilitating the swallowing of pills, tablets, capsules and other small objects.

Many persons experience difficulty in connection with the swallowing of pills, tablets or capsules for the reason that these objects frequently become lodged in the back of the mouth or in the throat. Generally this difficulty is not overcome by first swallowing some liquid, then taking the pill, tablet or capsule, and again swallowing more liquid. I have found, however, that if the object is swallowed simultaneously with the liquid, no difficulty is experienced, and also there is generally no taste of the tablet left in the mouth.

One of the objects of this invention consequently is to provide an object holder or device by means of which a pill, tablet, capsule or other object may be swallowed simultaneously with a quantity of liquid.

Another object is to provide a device formed to be mounted in a drinking vessel, such for example as a glass or cup, in such manner that the object may be temporarily held by such device until removed therefrom by the liquid to be swallowed.

A further object is to provide an attachment for a drinking vessel which may be easily positioned in and removed from a drinking vessel, and which will keep the object out of the liquid until a drink is taken, whereupon the object will readily pass into the mouth of the user simultaneously with liquid to be swallowed.

Another object is to provide a device of this kind with resilient means for supporting the device in the drinking vessel.

Other objects and advantages will be apparent from the following description of some embodiments of the invention, and the novel features will be particularly pointed out hereinafter in connection with the appended claims.

In the accompanying drawings:

Fig. 1 is a top plan view of a drinking glass or vessel having an object holder embodying this invention arranged therein.

Fig. 2 is an elevation thereof.

Fig. 3 is a top plan view of the holder embodying the invention removed from the drinking vessel.

Fig. 4 is a side elevation thereof.

Fig. 5 is an end elevation thereof.

Fig. 6 is a sectional view thereof on line 6—6, Fig. 2.

Fig. 7 is a top plan view of a vessel having an object holder of modified construction arranged therein.

Fig. 8 is a sectional elevation thereof on line 8—8, Fig. 7.

Fig. 9 is a top plan view of a drinking vessel having a holder of another modified construction applied thereto.

Fig. 10 is a fragmentary, sectional elevation thereof on line 10—10, Fig. 9.

Fig. 11 is a top plan view of the holder shown in Figs. 9 and 10, removed from the drinking vessel.

Referring to Figs. 1 to 6, which disclose one embodiment of this invention, 15 represents a drinking vessel such, for example, as a glass, to which the holder may be applied. It will be understood, however, that this holder may equally well be applied to a cup or other type of drinking vessel.

The device or object holder for facilitating the swallowing of objects includes a body portion 17 which is of concave form, which is open at one side and at the top thereof, thus forming a concave portion 18 which can be held against the inner surface of the drinking vessel in any suitable or desired manner so as to form with the vessel a receptacle for the object 19, Fig. 6, to be swallowed. The device is preferably arranged in the vessel above the level of the liquid therein, which is indicated at 20 in Figs. 5 and 6, so that when the object to be swallowed is placed into the concave portion 18 of the body of the holder it will be kept dry until it is ready to be swallowed. This is particularly desirable if the object is readily soluble in liquid.

In order to facilitate the swallowing of the object, it is necessary to surround the object with liquid to be swallowed, such as water, milk or the like, and means are provided for admitting liquid into the receptacle formed by the concave portion, in sufficient quantity to wash the object out of the concave part of the holder and into the mouth of the user. In the construction illustrated by way of example, the body portion is provided with suitable openings or passages to permit the liquid to enter into the body portion and thus carry the object in a quantity of liquid to the mouth of the person using the device. These passages for the liquid are made small enough so that the object cannot drop through the same into the liquid in the vessel, but they must permit a sufficient quantity of liquid to pass through the same into the receptacle formed in part by the body portion to flush the article out of the receptacle into the mouth of the user.

In the particular construction shown by way of example, I have provided the edge of the body portion which contacts with the vessel with a plurality of recesses or passages 22 through which the liquid from the vessel may pass. It will be obvious that any other passages may be provided such, for example, as a plurality of small holes in the concave or recessed part 18 of the body portion.

The body portion of the holder may be held in the vessel in any suitable or desired manner so that the same is below the upper edge of the vessel and preferably above the liquid level 23. In the construction shown in Figs. 1–6, by way of example, I have made the body portion 17 of a resilient or rubber-like material and provided it at opposite sides thereof with integral extensions or arms 24 which project laterally from opposite sides of the body portion, as clearly shown in Fig. 3. When the holder is placed into a vessel, these arms as well as the body portion itself, may be flexed so that the arms will lie in contact with the inner surface of the vessel. By making the body portion 17 of a resilient material, the serrated edge portion thereof will also shape itself to some extent to fit the interior of the vessel so that the same, when positioned in the vessel, will assume a shape approximately as shown in Fig. 1. A close fit of the body portion to the interior of the vessel is not necessary, since a slight space between the body portion and the vessel will merely admit more liquid to facilitate swallowing of the capsule or other object. The arms 24 are made long enough so that the entire device will extend preferably along a portion of the interior of the vessel greater than one-half the circumference thereof. The arms 24 will consequently adhere by friction to the inner surface of the vessel so that the same will not be dislodged when in use. The device may, however, be easily taken out of the vessel, since it is merely held therein by friction.

Other means for positioning the object holder in a vessel may, of course, be employed. For example, in Figs. 7 and 8 I have provided a holder which is also made of rubber or rubber-like material and which has a body portion 25 similar to that shown in Figs. 1 to 6, and having arms 26 which are formed integral with the body portion and extend toward opposite sides thereof. These arms are provided with suction cups 27 which may be pressed into engagement with the inner surface of the vessel so as to hold the device in the vessel. Since the body portion and arms are made of a rubber-like material which can be readily flexed, the suction cups may be formed integral with the arms, and the device can be attached to the interior of the vessel by pressing the suction cups against the interior of the vessel to expel some of the air from the suction cups.

It is not necessary that the holder be made of a resilient or rubber-like material. In Figs. 9 to 11 I have shown a holder 30 which is of a shape similar to those shown in Figs. 1 to 8, and which may be made of a relatively rigid material such, for example, as a molded plastic composition. In order to hold this body portion in a vessel, I have provided a pair of arms 31, preferably made of spring wire, and extending to opposite sides of the body portion 30, and shaped so that they will engage the inner surface of the vessel 15 to support the object holder therein, in a manner similar to that described in connection with Figs. 1 to 6. The inner ends of the spring members 31 may be molded into the body portion 30 of the holder. If desired, holes or openings 32 may be provided in the body portion of the holder to form passages for the liquid. These holes may be used to supplement the passages 33 formed in the edge of the holder, or a larger number of holes 32 may be provided in place of the passages 33. The spring arms 31 may be of any suitable shape, and in the construction shown are of substantially U-shape, having both end portions thereof molded into the body portion.

In the use of the devices shown in the drawings, it will be obvious that after the holder has been positioned in the drinking vessel and a pill or other object placed therein, the user places the drinking vessel to his mouth so that his mouth will be immediately above the body portion of the holder. If the level of the liquid in the drinking vessel is below the body portion of the holder, then if the drinking vessel is tilted, it will be obvious that the liquid therein will flow into the holder through the passages formed in the body portion thereof and will carry the object with it into the mouth of the user. Consequently, the object will be completely surrounded by the liquid and will have no tendency to adhere to any of the membranes of the mouth or throat and will pass into the esophagus practically unnoticed by the user. When using the device described with certain types of capsules which are not readily soluble in water, the level of the liquid in the drinking vessel may of course be somewhat above the bottom of the body portion of the holder without interfering with the operation of the same. It is also possible at times that some liquid will pass over the top edge of the holder at the part thereof adjacent to the vessel, but this will not interfere with the flushing of the object into the mouth of the user.

It will be understood that various changes in the details, materials and arrangements of parts which have been herein described and illustrated in order to explain the nature of the invention, may be made by those skilled in the art within the principle and scope of the invention as expressed in the appended claims.

I claim:

1. A device made of a flexible resilient material for facilitating the swallowing of small objects, which comprises a body portion having a recessed part open at the upper end and one side thereof, said side being formed to cooperate with the interior of a drinking vessel to form with said vessel a receptacle for the objects, said recessed part having formed therein passages for a liquid contained in said vessel, through which said liquid may flow when said vessel is tilted for drinking, and arms extending straight outwardly from opposite sides of said body portion and which are flexed to conform to and frictionally grip the interior of a vessel below the upper edge thereof, for supporting the objects to be swallowed until the vessel is tilted for drinking.

2. A device for facilitating the swallowing of small objects, which comprises a body portion made of a flexible and resilient material and having a recessed part open at the upper end and at a side thereof and formed to cooperate with the interior of a drinking vessel with said open side in contact with the interior of said vessel to form with said vessel a receptacle for the objects, said recessed part having formed therein passages for a liquid contained in said vessel, through which said liquid may flow when said vessel is tilted for drinking, and resilient arms extending outwardly from said body portion to frictionally engage a drinking vessel below the upper edge thereof to removably support said body portion therein, said arms holding said device in said vessel solely by friction.

3. A device for facilitating the swallowing of small objects, which comprises a body portion having a recessed part open at the upper end and at a side thereof and formed to cooperate with the interior of a drinking vessel to form with said vessel a receptacle for the objects, said recessed part being substantially imperforate and terminating at said open side in a plurality of shallow recesses through which a liquid contained in said vessel may pass when said vessel is tilted for drinking, and resilient arms extending laterally outwardly from opposite sides of said body portion to engage the interior of a drinking vessel below the upper edge thereof to frictionally and yieldingly support said body portion therein.

4. A device for facilitating the swallowing of small objects, which comprises a recessed body portion open at the upper end and one side thereof and having arms formed integral with the body portion and extending outwardly therefrom at opposite sides thereof, said body portion and arms being made of a resilient rubber-like material which permits the arms to be flexed for inserting the device in a drinking vessel to frictionally grip the interior of the same below the upper edge thereof and to position said open side of the recessed body portion in close proximity to the interior of the vessel to form therewith a receptacle for holding an object to be swallowed, said body portion being provided with a plurality of passages in an edge portion thereof facing said vessel through which a liquid contained in the vessel may flow into said recessed body portion when the vessel is tilted for drinking, for flushing the object into the mouth of the user, said body portion being flexible to permit said open side to assume curvatures corresponding substantially to the interior of said vessel.

5. A device according to claim 4, characterized in that said arms have cavities therein forming suction cups for securing said device to the interior of a vessel.

6. A device for facilitating the swallowing of small objects in accordance with claim 2, in which said resilient arms are made of spring wire secured to said body portion.

FREEL F. BRYAN.

References Cited in the file of this patent

UNITED STATES PATENTS

| Number | Name | Date |
|---|---|---|
| 442,698 | Yates | Dec. 16, 1890 |
| 1,264,539 | Magel | Apr. 30, 1918 |
| 1,275,467 | Poulalion | Aug. 13, 1918 |